Oct. 24, 1939.　　　M. F. PERKINS ET AL　　　2,177,551
PROCESS AND APPARATUS FOR PRODUCING UNIFORM-SIZED PARTICLES
Filed Oct. 19, 1934
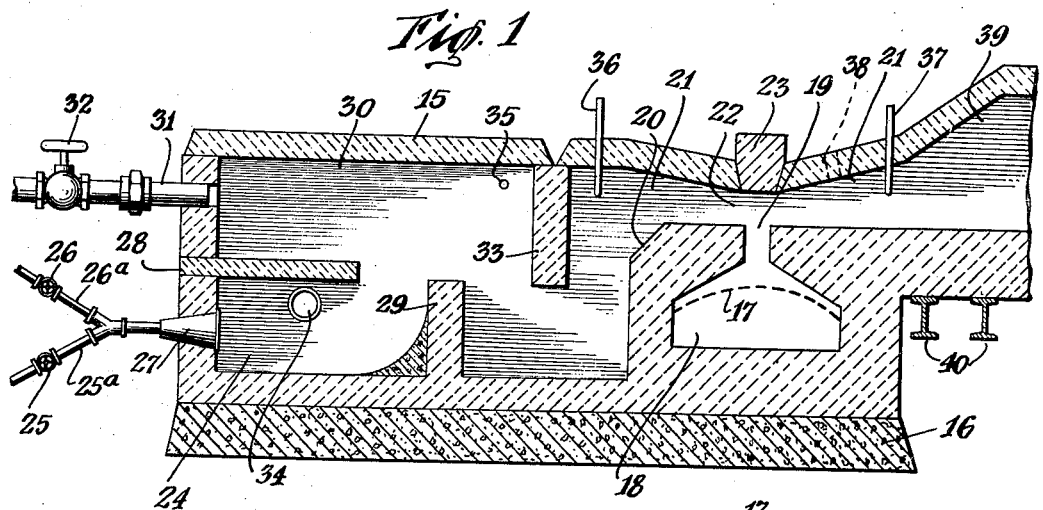
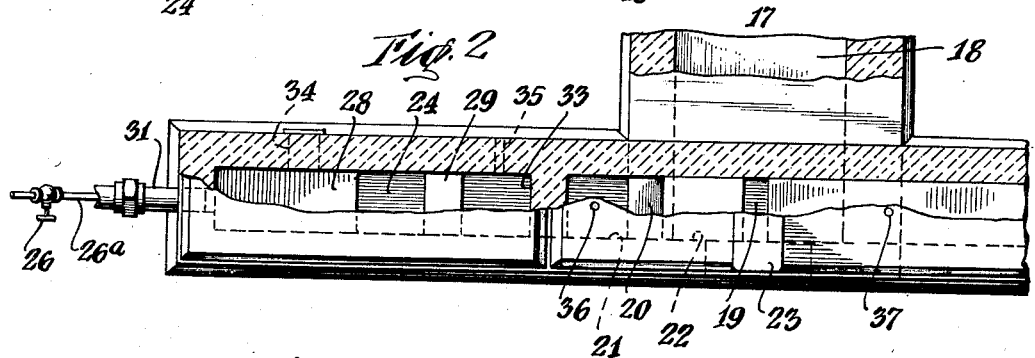
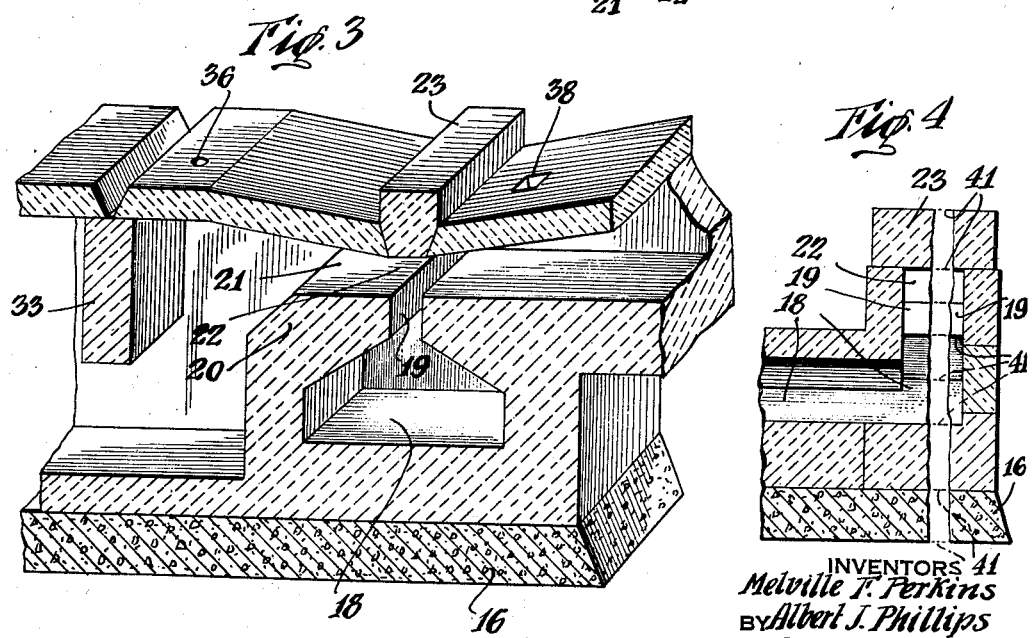
INVENTORS
Melville F. Perkins
BY Albert J. Phillips
James K. Kent
ATTORNEY Patented Oct. 24, 1939

2,177,551

UNITED STATES PATENT OFFICE 2,177,551

PROCESS AND APPARATUS FOR PRODUCING UNIFORM-SIZED PARTICLES

Melville F. Perkins, Woodbridge, and Albert J. Phillips, Metuchen, N. J., assignors to American Smelting and Refining Company, New York, N. Y., a corporation of New Jersey Application October 19, 1934, Serial No. 749,134

10 Claims. (Cl. 23—144)

The present invention provides an improved process and apparatus for the quenching of vapors for the production of particles of definite size, composition, and physical structure; and while the invention is of general adaptability and utility, it is particularly applicable to the condensation of vapors containing antimony trioxide, so that particles of antimony trioxide of definite size and physical state will result, the resulting product having such properties of color, particle size, density, and purity of composition as will render it valuable as a pigment.

Certain metal oxides, particularly antimony and arsenic trioxides, have appreciable vapor pressures at elevated temperatures, permitting the purification of such oxides by fuming them away from contaminating impurities. Such fuming is readily done in a variety of furnaces which, however, in every case, depend upon the principle of sweeping a carefully regulated stream of gases across the surface of the heated charge. This stream of gases carries the vaporized oxide from the furnace as rapidly as the vapor pressure of the oxide and the velocity of sweeping gas permit. Upon cooling this gas, the vaporized metallic oxide condenses and is caught in settling chambers, baghouses, Cottrell precipitators, or other suitable devices.

If the cooling of the gases issuing from the furnace is accomplished solely by the use of long cooling flues and kitchens, most of the oxide will condense on the sidewalls of such cooling device. This necessitates the construction of large flues and kitchens to provide room for this condensation, and also involves a considerable amount of unpleasant, if not hazardous, labor in removing such condensed oxides from the flues and kitchens.

The product obtained by this method of condensation is extremely non-uniform in crystalline make-up, varying from extremely coarse, often needle-like particles, to extremely fine particles of colloidal dimensions. This condition of uncontrolled particle size is objectionable for many uses to which the fumed product is put, and in some cases prohibits the use of such material.

The defects of the condensing devices of the prior art are now known to be due to faulty methods of intermixing gaseous streams having different temperatures. Also, insufficient consideration was given to the disturbing effects resulting from liberation of heat (latent heat and/or heat of reaction) during the intermixing of the several streams of gas. No means were provided for conditioning the particles during and after their formation.

The present invention is based upon the discovery that if instead of condensing the metallic oxide on the sides of flues, etc., cold air be admitted at the furnace outlet to cool the gases to such a degree as to cause in effect, precipitation of the metallic oxide, a uniform particle size can be obtained in the collected dust, the air being admitted in controlled amounts for causing the complete and uniform precipitation of the metallic oxide from the hot gases. There are employed auxiliary cooling flues to lower the temperatures so that the dust may be caught in bags or other devices. It has been found that with properly designed flues and a correctly regulated air inlet, there will be practically no accumulation of dust within the flues. In practice, the two streams that are to be intermixed are caused to move at rapid linear velocities and to intersect at substantially right angles in such a manner that the hotter fluid ascends into and intermixes with the colder stream as the latter stream moves with rapid velocity through a substantially horizontal flue.

Additionally, the present invention includes the discovery that not only can a uniform particle size be obtained by proper regulation of the cooling air, but also the particle size as well as uniformity can be regulated by a regulation of the temperature of the air admitted. For example, if a certain furnace and flue arrangement produces a non-uniform particle size, the amount of air admitted at the flue entrance is increased until the particle size obtained is uniform. If the particle size thus produced is too fine for the purpose intended, the temperature of the air admitted is increased until the correct particle size is obtained. Usually it has been found necessary to increase the volume of air admitted as the temperature is raised to particle size uniformity.

It may be seen, therefore, that one of the objects of the present invention is to provide an improved process for recovering from vapors or fumes, particles of a desired product having a predetermined size and predetermined physical properties.

A further object of the invention is to provide a process and apparatus whereby such vapors or fumes may be cooled or quenched under closely controlled conditions favoring the precipitation of particles of predetermined size and predetermined physical properties.

A still further object of the invention is to provide a process and apparatus whereby the quenching conditions may be regulated to vary the size of the particles precipitated.

A still further object of the invention is to provide an apparatus in which the quenching action above referred to is carried out by causing the streams to be intermixed to move at rapid linear velocities and to intersect at substantially right angles in such a manner that the hotter fluid ascends into and intermixes with the colder stream, the latter moving at high linear velocity in a substantially horizontal direction.

A still further object of the invention is to provide an apparatus wherein the warmer gas stream is caused to penetrate the colder stream moving at the aforesaid high linear velocity, the stream resulting from the union continuing to move at sufficient velocity to insure turbulent flow.

A still further object of the invention is to provide an improved apparatus of unique design for effecting the desired quenching and mixing and in which is avoided objectionable accretions or deposits of precipitated material, so that the operations of the invention can be carried out without trouble from such source.

Other objects of the invention will appear hereinafter, the novel features and combinations being set forth in the appended claims.

Before proceeding with a detailed description of the present invention, certain general features may be pointed out for facilitating the understanding of the invention.

As has been indicated above, the present invention involves quenching a fume or vapor containing metallic oxides by intermixing therewith a stream of colder gases under controlled conditions to effect a precipitation of the metallic oxide in the form of particles of a desired predetermined size and physical properties. To this end, the present invention involves leading the colder fluid stream horizontally along a duct of substantially rectangular cross section and such dimensions that will assure a high linear velocity of the stream at the zone where the warmer gas stream is caused to ascend through a transverse slot, or nozzle, or grill, as will be hereinafter explained in greater detail, and thus penetrate the colder stream, the stream resulting from the union continuing to move substantially at sufficient velocity to assure a turbulent flow.

It is preferred to cause the hotter fluid stream to be introduced into the lower zone of the colder stream, so that there may be taken a full advantage of the differences or the instantaneous densities of the fluid streams involved, not only at the moment of contact of the two streams but also as the warmer stream penetrates into the colder stream. In this manner, there are employed two distinct forces to assist in the intermixing of the two streams, i. e., the jet action of the entering streams, and the mixing force due to differences in density of the two streams. The differences in densities are important. For example, when working under normal atmospheric pressures, air at 125° C. weighs 0.055 pound per cubic foot, while flue gas at 1000° C. weighs 0.018 pound per cubic foot, the weight per cubic foot for air being about three times the weight of a cubic foot of the hot flue gases. It should be remembered also that most substances give out a latent heat of vaporization or sublimation when passing from the vapor state to the liquid or solid state. Thus, when the two fluid streams are intermixed in the manner of the present invention, the heat releases just mentioned serve to increase the speed of intermixing.

Prior to the present invention, it has been proposed to carry out operations of the present type by directing the heated stream upwardly into a free space or into a chamber of large dimensions; or to direct the condensable vapor upwardly through a duct just above the upper end of which is placed, circumferentially, a conduit provided with a slot or a multiplicity of holes from which a quenching stream may be directed into the ascending stream of condensable vapor. Test runs have shown that the methods of the prior art just outlined have many defects. The quenching gas does not penetrate the ascending stream with sufficient rapidity. In some reactions the larger volumes of quenching gas freeze the equilibrium before completion of the desired chemical process or the attainment of the proper physical state; and no provision is made to control the state of the particles after their formation.

Such defects as are above indicated are avoided by the present invention, wherein the quenching operation is carried out by the use of ducts coupled to a mixing throat of unique design. In the process of the present invention, the gases after completion of the intermixing may be retained in heat insulated flues until the desired chemical and physical transformations have been effected. However, if the invention is being used upon materials the processing of which requires a sudden quenching after intermixing of the two streams, the quenching may be effected by various means, such as by employing a second quenching device, or venting the final gas stream into a large chamber, or by releasing it into the space under a suitably designed hood which in turn is connected to a suitable collecting system such as a baghouse.

The various gas streams are moved through passageways that are substantially rectangular in cross-section. It is preferable that the nozzle through which the hotter gas is directed into the stream of colder gas be substantially rectangular in cross-section and is placed at substantially right angles, vertically and horizontally, to the duct through which the less heated gas is conducted. The distance from the outlet of the nozzle to the opposite wall of the other duct is limited to a few inches, or less, if needed, so that the gas from the nozzle will promptly penetrate and will quickly and completely intermix with the other stream. The use of ducts of rectangular cross-section is not inoperative, nor is the angle of intermixing of the several gas streams limited to substantially right angles. However, numerous tests, involving the production of many tons of products, indicate that a horizontally disposed rectangular duct pierced at right angles by a rectangular nozzle produces a product containing particles of a more uniform size.

It is found, in practice, that the improved design of the present quenching device permits a wide tolerance as to the amount of gas treated in unit time. Also, any great increase in the capacity of the equipment is readily effected merely by increasing the width of the device, an increase in width not altering the depth of the horizontally flowing gas stream nor the effectiveness of intermixing of the several streams at the mixing throat. Thus the capacity of a unit may be doubled, trebled, quadrupled, etc., with complete assurance that the extended unit will produce the desired size of particles without restandardization.

The chemical composition and temperature of the quenching stream is arranged to fit the particular process and problem. The quenching fluid may be obtained in a number of ways. It may be composed of air or flue gases or a mixture thereof. The temperature of the quenching fluid is also dependent upon the product being produced and the range of particle size desired. A quenching gas of a temperature above atmospheric readily may be obtained by the use of heat recuperators, heat regenerators, or by the introduction of hot gases into the quenching stream. In the utilization of hot gases, it has been found desirable to complete the combustion in an alcove or a combustion chamber and then intermix the hot gases of combustion with the colder gases to form the quenching gas. The hot gases from the combustion chamber are projected upwardly into the colder stream and the resulting stream passed around several baffles to insure complete mixing of the quenching medium before it reaches the quenching throat.

A suitable quenching gas thus obtained is conducted to the mixing throat where intermixing with the pregnant vapor is effected. As mentioned above, the hotter stream is caused to ascend into the cooler stream to increase the mixing effect. The manner in which the stream of mixed gases leaving the quenching throat is handled depends upon the particular substances involved.

In intermixing two or more streams having substantially the same temperature, it is advantageous to cause the stream or streams of less density to ascend into the stream or streams of greater density, providing endothermic reactions which would overshadow the differences in density are absent.

In carrying out trial runs in connection with the present invention, the following general procedure was followed and general observations made:

In the fuming of antimony trioxide, the charge is melted in a refractory hearth and the bath is swept with spent combustion gases of controlled analysis. The fume from the furnace is sucked into a flue which has built into it a specially constructed orifice through which the "quenching" air is admitted. If small amounts of air are admitted through the orifice, the antimony oxide produced will be non-uniform in particle size, ranging from large visible needles to particles sub-microscopic in dimension. Under these conditions there is a substantial amount of condensation of antimony trioxide within the flues, necessitating frequent cleaning of the flues. However, when the amount of air admitted is increased, the range of particle size will decrease until finally the product will be so uniform in particle size that additional air will not effect an improvement. If the air admitted is not preheated, it has been found that the particles produced will be extremely fine, many of them being beyond the resolving power of the best microscopes.

With the above general considerations in mind, attention is called to the accompanying drawing, in which is illustrated preferred forms of apparatus which may be employed in carrying out the process of the present invention. In the accompanying drawing, Fig. 1 is sectional elevation of a suitable form of apparatus for the practice of the process of the invention and embracing the features set forth above.

Fig. 2 is a plan view thereof, partly in section.

Fig. 3 is an enlarged sectional perspective view of the quenching throat shown in Fig. 1.

Fig. 4 is a sectional elevation taken along the line 4—4 of Fig. 2.

Referring more particularly to the drawing, the quenching furnace comprises an elongated refractory body 15, of firebrick or other suitable refractory material, mounted on a suitable base or foundation 16, conveniently of concrete. A passageway 17 of heat resisting brick or the like, enters one side of the refractory body structure 15, and connects the source of vapor, not shown, with reaction chamber 18, extending transversely of the furnace. A rectangular nozzle 19, built in arch 20, connects the reaction chamber 18 with the horizontal duct 21 at the quenching throat 22, which is restricted, as shown, to give increased efficiency of mixing. A removable door 23 provides access to the quenching throat 22. The combustion chamber 24 is provided with a fuel burner 27, the fuel supply to which is controlled by a valve 25, positioned in fuel line 25a, while the air supply for the burner is controlled by valve 26 positioned in the air line 26a. A baffle 28 of suitable refractory material such as silicon carbide and a fire bridge 29 confine the flame until combustion is complete. In order to cool the combustion gases, these gases are mixed in a mixing chamber 30 with cold air entering the chamber through pipe 31 controlled by a valve 32. Thorough mixing of the air and combustion gases is accomplished by the provision of a baffle 33, which is suitably positioned between the mixing chamber 30 and the quenching throat 22. The combustion chamber 24 is provided with an inspection port 34, and samples of the mixed gases may be taken from the mixing chamber 30 by means of a gas sampling tube 35. The duct 21 is provided with thermometers and/or thermocouples 36 and 37 and with inspection or sampling port 38. The quenched products are removed through a flue 39, the flue 39 being supported on I-beams 40 and forms a continuation of duct 21.

It will therefore be seen that the quenching combustion gases pass through the duct 21 at throat 22 at rapid linear velocities and that the hot vapors containing the metallic oxides to be quenched and precipitated are injected, also at rapid linear velocities into the quenching gases through nozzle 19, the hot oxide-bearing vapors intersecting the colder quenching gases at substantially right angles in such a manner that the hotter vapors ascend into and intermix with the colder stream, as the latter moves with rapid velocity through the substantially horizontal duct 21 and quenching throat 22, the duct and throat being preferably of substantially rectangular cross-section. As previously pointed out in this description, the intermixing of the hot and colder streams in the manner just described results in a rapid and thorough intermixing, full advantage being taken of the jet action of the entering hot stream and the mixing force due to differences in the density of the two streams, there being produced thereby a rapid intermixing, and the stream resulting from the union of the hot and cold streams continues to move through the flue 39 at sufficient velocity to insure a turbulent flow.

The precipitated products emerging from the flue 39 are collected in any convenient manner. The quenching throat 22 is restricted so that the outlet of the nozzle 19 is brought within a few inches, or less, of the opposite wall of the throat so that the hot vapors from the nozzle will promptly penetrate the colder stream and will quickly and completely intermix therewith.

Fig. 4 indicates diagrammatically how the capacity of the equipment may be effected by simply building the mixing throat wider. This increase in width, as will be apparent from Fig. 4, does not alter the depth of the horizontally flowing gas stream, nor the effectiveness of intermixing of the several streams at the mixing throat. In Fig. 4 the alteration of the width of the quenching throat is indicated by dotted lines 41.

The operation of the apparatus illustrated in the drawing is exemplified by the following specific example, which example is to be regarded as merely illustrative and in no sense restrictive of the invention.

The quenching furnace 15 was first heated to the operating temperature by means of fuel burned in combustion chamber 24 at the burner 27 and by means of hot flue gases from the fuming furnace (not shown) which later served as a source of antimonial vapors. These hot flue gases act as sweeping gas and enter the quenching furnace by way of passage 17, chamber 18, and nozzle 19. The oxygen content of the sweeping gas was adjusted to about 3% by volume, as shown by an Orsat analysis. The temperature of the sweeping gas at the nozzle 19 was 790° C. The weight of the sweeping gas was 394 pounds per hour. The quenching gas (air) contained one-half of one per cent of carbon dioxide due to being heated by intermixing with hot gases of combustion. The quenching gas was delivered to throat 22 at a temperature of 125° C. at a rate of 1560 pounds per hour. When all parts of the apparatus were up to temperature, the impure antimony trioxide was charged to the furnace in such a manner that antimony troxide to the extent of 100 pounds per hour was present in the sweeping gas. The linear velocity of the quenching stream 21 at throat 22 was thirty-seven linear feet per second, while the velocity of the stream of pregnant vapor in the vertical nozzle 19 was thirty-two linear feet per second. The temperature of the mixture of the two gases was 260° C. as measured by the thermometer shown in the drawing as temperature measuring instrument 37. The gas stream containing the precipitated antimony trioxide was passed through the flue 39 to a baghouse. Substantially all the particles of the antimony trioxide produced under the conditions of the above illustration were between 0.1 and 0.3 microns in diameter and were crystallized in the cubic system.

The antimonial vapor stream may be formed in many ways and by the help of many types of fuel. The pregnant gas stream may be composed of antimony trioxide in gaseous solution in hot gases from the combustion of fuel gas or fuel oil as desired, both fuels in practice giving substantially equal success so that the choice is largely one of cost, and therefore is dependent upon the location where the operation is conducted. Tests also show that uniform antimonial vapors facilitate the production of particles of antimony trioxide of definite, controllable, and uniform size.

The present invention has many advantages. The quenching apparatus can be used to produce particles whose size-distribution may be held within a band of narrow limits, or particles whose diameter cover a wider range of size may be produced. The crystalline state of the product as well as the particle size is subject to minute control. The construction of the apparatus is simple, rugged and inexpensive, resulting in efficient operation with excellent fuel economies, and no accretions, undesirable deposits, or premature precipitation of the condensable vapor from the pregnant vapor stream have been encountered.

In addition to antimony and arsenic oxides, the present process may be applied also generally to the precipitation by quenching of other materials wherein the obtaining of definite sized particles is desired. Among such materials may be mentioned as specific examples antimony sulphide, tin oxide, lead oxide, and other volatilizable oxides, though the invention is not limited necessarily to such specific substances.

While certain novel features of the invention have been disclosed herein, and are pointed out in the annexed claims, it will be understood that various omissions, substitutions and changes may be made by those skilled in the art, it being intended and desired to embrace within the scope of this invention such modifications and changes as may be necessary to adapt it to varying conditions and uses.

What is claimed is:

1. An apparatus for effecting condensing and precipitation of materials from fluid streams carrying such materials, which comprises a furnace body defining communicating combustion and mixing chambers, a burner in the combustion chamber for heating the furnace, an air inlet for introducing air into the furnace for mixing with gaseous combustion products in the mixing chamber for cooling such products, a substantially horizontal duct communicating with the mixing chamber and opening into a substantially horizontal quenching throat, the duct and throat being of substantially rectangular cross-section and the throat being vertically restricted, a reaction chamber in the furnace body beneath the quenching throat and provided with a passage adapted to be connected with a source of the materials to be precipitated, and a nozzle extending vertically from the reaction chamber into the quenching throat, the said nozzle being of substantially rectangular cross-section, the said nozzle opening into the quenching throat adjacent to the restricted portion thereof for injecting the material to be precipitated into the combustion products passing through the throat, thereby producing precipitation of the said materials, and a flue in substantial alignment with the duct and throat and forming a continuation of the said duct for leading the precipitated materials to suitable collecting means.

2. A process of condensing and precipitating antimony trioxide in the form of particles of predetermined size and physical character which comprises preparing a hot gaseous stream containing vapors of antimony trioxide, injecting such stream into a quenching gaseous stream of substantially lower temperature, and regulating the quenching stream by fixing the temperature and amount thereof to produce substantially immediately upon intermixing the streams a solidification of antimony oxide as fixed particles of predetermined particle size and physical character.

3. An apparatus for effecting condensation and precipitation of sublimable materials of predetermined particle size, which comprises in combination, a combustion chamber, a mixing chamber, a connection between the said chambers, means for introducing a cooling gas into the mixing chamber for cooling combustion gases in the combustion chamber, a quenching throat communicating with the combustion chamber, the said quenching throat contracting in cross-sectional area intermediate its intake and outlet, a reaction chamber for receiving a gas stream laden with vapors of a sublimable material, means for injecting the said gas stream from the reaction chamber into the quenching throat at its constricted portion for commingling the said gas with relatively cool quenching gas passing through the throat for condensing the vaporized materials, and means for controlling the velocity and temperature of the quenching gas for effecting condensation of the said vapors as solid particles of predetermined particle size range.

4. A process for producing antimony oxide which comprises preparing a hot gaseous stream pregnant with antimony oxide, preparing also a relatively cool stream of quenching gas, and effecting a substantially instantaneous solidification of antimony oxide of high concentration of particles within a narrow, predetermined particle size limit and of fixed crystal shape, by introducing the hot pregnant stream into the bottom of the quenching stream and allowing the hot stream to rise through the quenching stream while maintaining the temperatures and velocities of the streams such that immediate solidification of antimony trioxide occurs at the location of gas intermixing as particles of fixed predetermined size and homogeneous crystal structure.

5. A process for producing antimony oxide which comprises preparing a hot gaseous stream pregnant with antimony oxide, preparing also a relatively cool stream of quenching gas, and effecting a substantially instantaneous solidification of antimony oxide of a high concentration of particles within a narrow, predetermined particle size range and of fixed crystal shape by introducing a substantially vertical jet of the hot pregnant stream into a substantially horizontal stream of the quenching gas moving at substantially right angles to the pregnant stream, causing the pregnant jet to enter the quenching jet in a lower part of the latter so as to cause the pregnant gas to ascend through the quenching gas, and adjusting the amounts, temperatures and linear velocities of the gases to effect the predetermined solidification of the antimony oxide as particles substantially entirely within a particle size range of 0.1 and 0.3 micron and of fixed crystal form, and causing the said precipitation to occur substantially completely where the pregnant stream injects into the quenching stream.

6. A process for producing antimony oxide having substantially entirely a particle size between 0.1 and 0.3 micron and crystallized in the cubic system which comprises preparing a hot gaseous stream pregnant with antimony oxide, preparing also a relatively cool stream of quenching gas, effecting a substantially instantaneous solidification of antimony oxide particles of fixed particle size and shape by introducing a substantially vertical stream of the hot pregnant gas into a substantially horizontal jet of quenching gas moving at substantially right angles to the pregnant stream, causing the pregnant stream to enter the quenching stream in the lower part of the latter so as to cause the pregnant gas to ascend through the quenching gas, and maintaining the conditions in the pregnant and quenching streams in approximate proportion to the following values: temperature of pregnant gas 790° C., temperature of quenching gas 125° C., rate of pregnant gas 394 pounds per hour, rate of quenching gas 1560 pounds per hour, amount of antimony oxide in pregnant gas 100 pounds per hour, linear velocity of the pregnant stream 32 linear feet per second, linear velocity of quenching stream, 37 linear feet per second, temperature of resultant gas immediately after mixing 260° C.; and collecting the solidified antimony trioxide.

7. A process for treating fluid streams carrying sublimable materials in vapor phase which comprises introducing a fluid stream pregnant with such materials into the lower portion of a quenching fluid stream of substantially greater density and at substantially lower temperature than the pregnant stream so as to cause the pregnant stream to rise through the quenching stream, and maintaining the physical conditions of the streams as to relative volume, velocity, concentration, and temperature as to produce substantially instantaneously at the point of mixing a condensation of the said materials directly into solid particles of high concentration within a predetermined closely controlled and standardized particle size and fixed crystal form.

8. A process for producing antimony trioxide in the form of particles of predetermined size and physical character which comprises preparing a hot gaseous stream pregnant with vapors of antimony trioxide, injecting such stream into a gaseous quenching stream of substantially lower temperature, causing the pregnant stream to ascend through the quenching stream, and maintaining the quenching stream relative to the pregnant stream as to volume, velocity, and temperature to produce substantially upon intermixing the streams, a solidification of antimony oxide as fixed particles of high concentration within a predetermined closely controlled and standardized particle size range and of stable crystal form.

9. A process of condensing and precipitating antimony oxide as solid particles of substantially definite and uniform predetermined particle size and of definite predetermined crystal form from a gaseous stream carrying antimony oxide in vapor phase which comprises preparing a hot, rapidly moving, substantially rectilinear gas stream pregnant with the vapors of the antimony oxide and injecting such hot stream into a rapidly-moving, relatively cold quenching stream of substantially rectangular cross section of less vertical height than horizontal width, the hot pregnant stream being injected into a lower portion of the quenching stream and at substantially right angles thereto thereby causing the hot stream to ascend through the relatively colder quenching stream while controlling the temperature and volume of the quenching stream to produce at substantially the point of injection a solidification of the said antimony oxide as substantially uniform particles highly concentrated within narrow limits of predetermined particle size and definite predetermined crystal shape.

10. A process of condensing and precipitating sublimable materials as solid particles of substantially definite and uniform predetermined particle size and of definite predetermined crystal form from gaseous streams carrying such materials in vapor phase which comprises preparing a hot, rapidly-moving, substantially rectilinear gas stream pregnant with the vapors of the material, injecting such stream into a lower portion of a rapidly-moving relatively colder quenching stream of substantially rectangular cross-section at substantially right angles thereto thereby causing the hot stream to ascend through the colder quenching stream, and controlling the velocity, temperature and amount of the quenching stream to produce at substantially the point of injection a solidification of the said materials as substantially uniform particles highly concentrated within narrow limits of particle size.

MELVILLE F. PERKINS.
ALBERT J. PHILLIPS.